United States Patent [19]

Golz

[11] 4,245,010
[45] Jan. 13, 1981

[54] EXPLOSION PROTECTION FOR STORAGE BATTERIES

[75] Inventor: Hans-Joachim Golz, Hanover, Fed. Rep. of Germany

[73] Assignee: Varta Batterie Aktiengesellschaft, Hanover, Fed. Rep. of Germany

[21] Appl. No.: 6,097

[22] Filed: Jan. 24, 1979

[30] Foreign Application Priority Data

Feb. 4, 1978 [DE] Fed. Rep. of Germany ....... 2804750

[51] Int. Cl.³ .............................................. H01M 2/12
[52] U.S. Cl. ....................................... 429/56; 429/225
[58] Field of Search ............................. 429/56, 53–55, 429/225–228

[56] References Cited

U.S. PATENT DOCUMENTS

| | | | |
|---|---|---|---|
| 3,288,642 | 11/1966 | Kordesch | 429/56 |
| 3,401,314 | 9/1968 | Steele, Jr. | 429/56 X |
| 3,688,162 | 8/1972 | Willy et al. | 429/56 X |
| 3,741,813 | 6/1973 | Bergum et al. | 429/53 |
| 4,056,659 | 11/1977 | Spanur et al. | 429/54 |

Primary Examiner—Charles F. LeFevour
Attorney, Agent, or Firm—Weiser, Stapler & Spivak

[57] ABSTRACT

A thinned or weakened line surrounds a portion of the cell enclosure above the acid level.

9 Claims, 5 Drawing Figures

EXPLOSION PROTECTION FOR STORAGE BATTERIES

Especially during charging, lead storage batteries give off gases which are capable of exploding under certain circumstances. Gases are also created due to self-discharge, even when the storage battery is not in use.

Fundamentally, two types of ignition are possible for the explosion of gassing storage battery cells. One is external ignition outside the battery, the other takes place inside the battery. For ignition outside the battery, flame propagation into the interior takes place through the gas venting plug, unless precautions are taken. However, explosion of the cells can be prevented with high reliability by use of explosion-proof plugs. For this purpose porous sinter frit is used as ignition spark barriers. These utilize the principle of subdividing the gas stream into many extremely small components.

In contrast, with internal ignition, an explosion is practically unavoidable because the charging gases, or rather the over-charging gases and the ignition spark are created within the same enclosed space inside the storage battery.

Accordingly, it is a principal object of the invention to provide a lead storage battery having one or more cells in which the consequences of such a reaction, which may range from a light puff to a powerful explosion, are confined within the narrowest possible limits.

In accordance with the invention, this and other objects which will appear are achieved by surrounding at least one surface portion of the outer cell enclosure above the acid level with a border of material having reduced thickness and/or reduced strength. Preferably, the fracture or blow-out areas so created are located in the horizontal lid surface. Should an explosion occur in the presence of such a fracture area, whether due to internal or to external ignition—in the event that explosion-proof plugs are not used—the cell ruptures along the weakened line which surrounds the surface portion and the explosion pressure can vent to the outside. Of course, it is also possible to provide a plurality of such fracture areas.

In the absence of the means embodying the invention, the consequences of a cell explosion are generally very serious. On the one hand, parts of the cell are projected outwardly and can cause damage. On the other hand, the walls of the cell may tear open to below the acid level, so that the sulphuric acid escapes and causes considerable damage.

Of particular importance is the dimensioning of the residual material thickness of the boundaries of the surface portions, i.e., the fracture areas. These must be so proportioned that the cell breaks open reliably along the line provided for that purpose in case of explosion. On the other hand, the thickness of the material in that location must still be great enough that no damage occurs during normal usage. In practical experiments it has been found that this thickness of material should be between 0.2 and 0.6 times the thickness of the material of the normal cell wall. For lead storage battery casings of polypropylene, this normal material thickness is about 1.6 to 2.8 millimeters.

In order to obtain a comparable effect, circular apertures can be formed in the lid surface and these can be closed with plug-in stoppers. If properly dimensioned, these stoppers would be projected outwardly in case of explosion. A disadvantage is that such an arrangement is more costly because additional parts are necessary. For example, in a starter battery 6 plugs are required. A further disadvantage is that the seating of the plug is appreciably temperature dependent. At low temperatures the seat is very loose, so much so that there is even the possibility that the plugs may fall out. At a higher temperature, the seating can become so firm that the cell rips open at a different location in the event of an explosion. Even the possibility of reclosing a cell which is afforded by such an arrangement is undesirable. If internal ignition should have taken place, then this is traceable to a defect in the battery, e.g. a loose plate, a fractured pole bridge, or a fractured connector, and such a battery should be replaced in any case.

For further details, reference is made to the discussion which follows in the light of the accompanying drawings wherein FIG. 1 is a top view of a block lid embodying the present invention;

Figure 1:
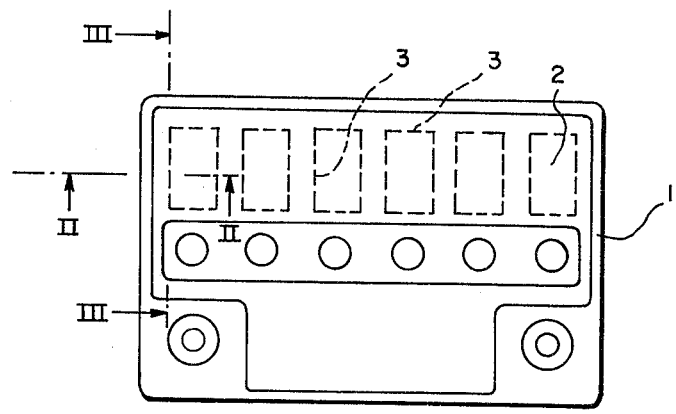

Referring now to the drawings, FIG. 1 shows a top view of a block lid 1 for lead storage batteries, which is conventional except as noted below. The horizontal surfaces of this block lid are provided with the fracture areas 2 embodying the invention. The tear lines are designated by reference numeral 3.

Figure 2:
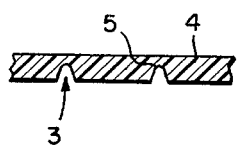
FIG. 2 is a fragmentary cross-section taken through II—II of FIG. 1.
Figure 3:
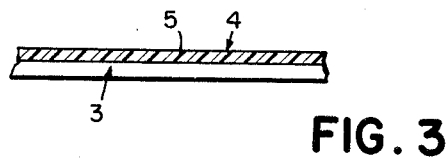
FIG. 3 is a fragmentary cross-section taken through III—III of FIG. 1.

FIG. 2 shows a fragmentary cross-section through the storage battery lid of FIG. 1 along the line II—II. As can be seen from this fragmentary cross-section, a groove 3 is provided within lid wall 4, so that the fracture area 2 is surrounded by a recess, which has only the residual thickness of material 5. This is also apparent in FIG. 3 which is a cross-section along line III—III in FIG. 1. In this embodiment, the thickness of the material is uniformly reduced in the formation of the encircling outline.

Figure 4:
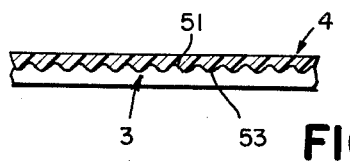
FIG. 4 is a fragmentary cross-section of another embodiment of the invention taken through III—III of FIG. 1.

A further improvement and increased reliability can be achieved, as shown in FIG. 4, by using a residual material thickness which is not uniform, but rather which varies its dimensions. As shown in FIG. 4, the residual material thickness exhibits wave troughs 51 and wave crests 52. Especially the wave crests 52 operate to counteract unintentional damage, whereas, in the event of an explosion, the material in the wave troughs 51 reliably ruptures at the very first moment, so that there arises a line of perforations which is immediately followed by separation of the entire fracture area.

Figure 5:
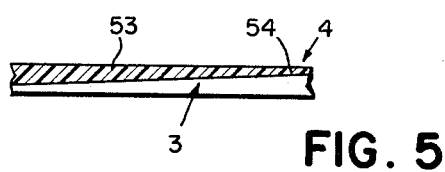
FIG. 5 is a fragmentary cross-section of still another embodiment of the invention also taken through III—III of FIG. 1.

It may further be advantageous to guide the explosive wave in a predetermined direction, as, for example, when it is known that this is the particular direction in which an explosion would cause the least damage, or when the cell construction is such that in this direction the least quantity of acid would escape in the course of an explosion. Such directed guidance of the explosion wave can be achieved, as shown in FIG. 5, by selecting the thickness of material in such a manner that the residual material thickness at one end of the fracture area is smaller than at the opposite end. In case of explosion the fracture area would rupture first in region 54 and only later in region 53.

To prevent soiling of the storage battery on the outside, the recesses or grooves which outline the fracture areas are preferably formed from the inside within the material of the lid or cell casing.

I claim:

1. Lead storage battery wherein at least one surface portion of the outer cell enclosure above the acid level contains a closed outline of material having reduced thickness, said outline of material defining two regions of said suface portion, the thickness of the region inside said outline of material being substantially equal to the thickness of the region outside said outline of material, and wherein said surface portion is substantially impervious to the flow of gas during normal operation of the battery.

2. The battery of claim 1 wherein the outline is provided on the interior side of the cell enclosure.

3. The battery of claim 1 wherein the surface portion is positioned in the horizontal surface of the lid.

4. The battery of claim 3 wherein the outline is provided on the interior side of the lid.

5. The battery of claim 1 wherein the outline enclosing the surface portion is a groove creating a reduced but uniform residual material thickness.

6. The battery of claim 1 wherein the outline surrounding the surface portion is a groove creating a reduced but non-uniform residual material thickness.

7. The battery of claim 6 wherein the residual material thickness undergoes one or more variations around the periphery of the surface portion.

8. The battery of claim 1 wherein the residual material thickness is between 0.2 and 0.6 times the unreduced minimum wall thickness of the enclosure.

9. Lead storage battery wherein at least one surface portion of the outer cell enclosure above the acid level contains a closed outline of material having reduced strength, said outline of material defining two regions of said surface portion, the thickness of the region inside said outline of material being substantially equal to the thickness of the region outside said outline of material, and wherein said surface portion is substantially impervious to the flow of gas during normal operation of the battery.

* * * * *